US012699812B2

(12) United States Patent
Rajgor et al.

(10) Patent No.: US 12,699,812 B2
(45) Date of Patent: Aug. 4, 2026

(54) CONTINUOUS IMPAIRMENT OF A CHIP UPON DETECTING A DAMAGED PACKAGE

(71) Applicant: Cisco Technology, Inc., San Jose, CA (US)

(72) Inventors: Samir Valjibhai Rajgor, Santa Clara, CA (US); Sachin Agarwal, Fremont, CA (US); Srirajkumar Sundararaman, San Jose, CA (US); Chirag Shroff, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 103 days.

(21) Appl. No.: 18/437,782

(22) Filed: Feb. 9, 2024

(65) Prior Publication Data

US 2025/0258964 A1 Aug. 14, 2025

(51) Int. Cl.
*G06F 21/75* (2013.01)
*G06F 21/72* (2013.01)
*G06F 21/86* (2013.01)

(52) U.S. Cl.
CPC ............ *G06F 21/755* (2017.08); *G06F 21/72* (2013.01); *G06F 21/86* (2013.01); *G06F 2221/034* (2013.01)

(58) Field of Classification Search
CPC ........ G06F 21/755; G06F 21/72; G06F 21/86; G06F 2221/034
See application file for complete search history.

(56) References Cited

U.S. PATENT DOCUMENTS 10,452,844 B2 * 10/2019 Hall ...................... G06F 21/554
10,678,953 B1 * 6/2020 Allo ...................... H04L 9/0877
11,861,053 B2 1/2024 Datta et al.
12,149,626 B1 * 11/2024 Filsfils ................ H04L 63/0209
12,452,033 B2 * 10/2025 Trevethan ............... H04L 9/085
(Continued)

FOREIGN PATENT DOCUMENTS

CN 116756730 A 9/2023

OTHER PUBLICATIONS

Rojas-Muñoz, L.F. et al., "Cryptographic Security Through a Hardware Root of Trust", Applied Reconfigurable Computing Architectures, Tools, and Applications. ARC 2024, pp. 106-119. (Year: 2024).*

(Continued)

*Primary Examiner* — Michael Pyzocha
(74) *Attorney, Agent, or Firm* — Lee & Hayes, P.C.

(57) ABSTRACT
A method for monitoring an Integrated Circuit (IC). The method includes decrypting, by the Root-Of-Trust (ROT) module, an identity package that resides in a non-volatile memory of the IC using a secret accessible by the ROT module. The identity package is configured in a decrypted state at the non-volatile memory by use of the secret. The ROT module is configured to discover, based on monitoring data from a sensor that an attack is at least being attempted on a package of the IC. The ROT determines whether a debug package is present in response to the attack. If the debug package is not present, the ROT module is configured to execute a tamper resistance process to prevent the use of the secret by the ROT module and the identity package from being placed or remaining in a decrypted state in the non-volatile memory of the IC.

23 Claims, 9 Drawing Sheets

(56) References Cited

U.S. PATENT DOCUMENTS

| | | | |
|---|---|---|---|
| 12,452,226 | B2 * | 10/2025 | Goodman ............... H04L 63/08 |
| 2014/0025960 | A1 * | 1/2014 | McLean .................. G06F 21/60 |
| | | | 713/189 |
| 2015/0033034 | A1 * | 1/2015 | Gerzon ................... G06F 21/71 |
| | | | 713/190 |
| 2015/0192637 | A1 | 7/2015 | Falk |
| 2016/0099969 | A1 * | 4/2016 | Angus .................... H04L 63/20 |
| | | | 713/158 |
| 2016/0239365 | A1 * | 8/2016 | Schweer ................. G06F 21/77 |
| 2016/0283723 | A1 * | 9/2016 | Roth ...................... H04L 9/0897 |
| 2019/0028283 | A1 | 1/2019 | Sharifi |
| 2019/0347213 | A1 * | 11/2019 | Lutz ...................... G06F 21/602 |
| 2020/0036509 | A1 * | 1/2020 | Seward, IV ........... H04L 9/003 |
| 2020/0082091 | A1 * | 3/2020 | Areno ................. G06F 9/45558 |
| 2020/0175170 | A1 * | 6/2020 | Diamant ............... H04L 9/3234 |
| 2020/0228351 | A1 | 7/2020 | Kreft |
| 2020/0342112 | A1 * | 10/2020 | Plusquellic ........... G06F 21/602 |
| 2021/0089685 | A1 | 3/2021 | Cheruvu |
| 2021/0097173 | A1 | 4/2021 | Randall |
| 2021/0149823 | A1 * | 5/2021 | Palmer ................... G06F 21/72 |
| 2021/0192050 | A1 * | 6/2021 | Hird ...................... G06F 21/606 |
| 2021/0303723 | A1 * | 9/2021 | Rooke ................. G06F 9/45512 |
| 2022/0245238 | A1 * | 8/2022 | Dasen ................... H04L 9/3247 |
| 2022/0305945 | A1 * | 9/2022 | Dooley ................... H04L 63/08 |
| 2022/0413936 | A1 * | 12/2022 | Elliott ................. G06F 9/45558 |
| 2023/0119361 | A1 * | 4/2023 | Chritz ............. H03K 19/17768 |
| | | | 713/171 |
| 2023/0134349 | A1 * | 5/2023 | Masterson ............. G06F 21/88 |
| | | | 713/193 |
| 2023/0401342 | A1 * | 12/2023 | Tajik ....................... G06F 21/57 |
| 2024/0354451 | A1 * | 10/2024 | Hodes .................... G06F 21/86 |
| 2024/0364536 | A1 * | 10/2024 | Wittenauer .......... H04L 9/0894 |
| 2024/0405519 | A1 * | 12/2024 | Clarke ................. H10D 89/911 |
| 2025/0200183 | A1 * | 6/2025 | Agarwal ................ G06F 21/57 |

OTHER PUBLICATIONS

Ehret, et al., "Hardware Root-of-Trust Support for Operational Technology Cybersecurity in Critical Infrastructures", 2023 IEEE High Performance Extreme Computing Conference, Sep. 25, 2023, pp. 1-7.

Nisagra, et al., "System-Level Tamper Protection Using MSP MCUs", retrieved from <<https://www.ti.com/lit/an/slaa715/slaa715. pdf?ts=1742912128604>> on Apr. 9, 2025, pp. 1-11.

Search Report and Written Opinion for International Application No. PCT/US2025/014846, Dated Apr. 9, 2025, 14 pages.

* cited by examiner

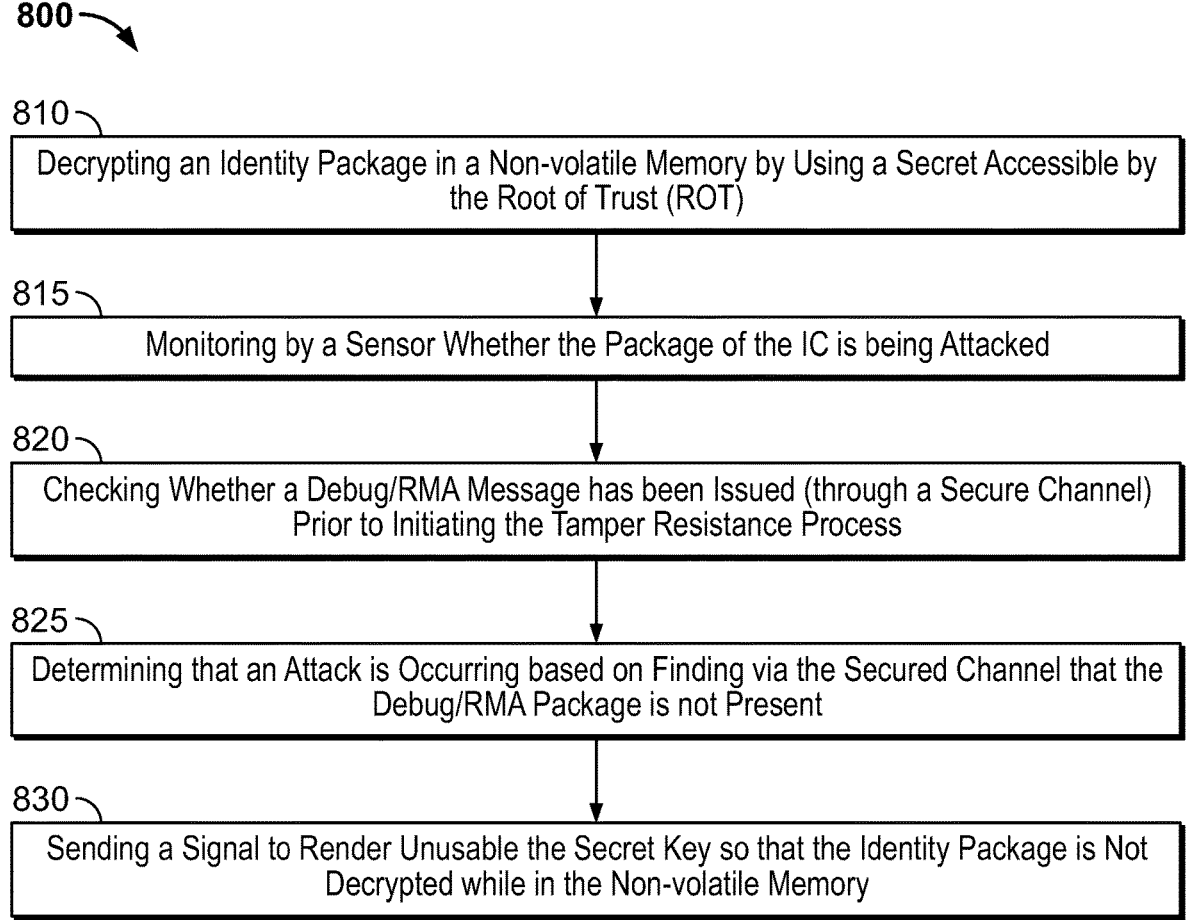

800

810
Decrypting an Identity Package in a Non-volatile Memory by Using a Secret Accessible by the Root of Trust (ROT)

815
Monitoring by a Sensor Whether the Package of the IC is being Attacked

820
Checking Whether a Debug/RMA Message has been Issued (through a Secure Channel) Prior to Initiating the Tamper Resistance Process 825
Determining that an Attack is Occurring based on Finding via the Secured Channel that the Debug/RMA Package is not Present 830
Sending a Signal to Render Unusable the Secret Key so that the Identity Package is Not Decrypted while in the Non-volatile Memory

FIG. 8

CONTINUOUS IMPAIRMENT OF A CHIP UPON DETECTING A DAMAGED PACKAGE

TECHNICAL FIELD

The present disclosure relates generally to chip-based security. Specifically, the present disclosure relates to systems and methods for a tamper resistance process that overwrites secret keys used by the Root-Of-Trust (ROT) to decrypt an identity package in response to an attack by an external entity.

BACKGROUND

An application-specific integrated circuit (ASIC) generally refers to an integrated circuit designed for a specific purpose. An ASIC tends to be quite efficient at performing the specific purpose for which it was designed as opposed to general-purpose circuits, like General Processing Units (GPUs) or Central Processing Units (CPUs), which can perform many different functions, but often less efficiently. A product may include a number of ASICs. As one example, the product could be a switch or a router that includes different ASICs to support different protocols. Other ASICs could be included for other purposes.

ASICs and the like may be configured with physical and individual descriptors and characteristics to prevent copying that is provided by a PUF (Physical Unclonable Function). The security of the ASIC relies on a secret (e.g., secret key) stored on secure hardware modules in the root-of-trust (ROT). Extracting by an outside entity those keys would break the security of the entire system.

The secret may be used to decrypt a package in a nonvolatile electrically erasable programmable read-only memory (EEPROM) or a battery-backed static random-access memory (SRAM) and that has been configured by hardware cryptographic operations such as digital signatures or encryption. The non-volatile memory or static memory may prove to be vulnerable to sophisticated invasive attack mechanisms.

Different types of device tampering may occur and include attempts to unauthorizedly modify a device's capability from a lower-end product to a higher-end product, and or gain the unlawful possession of a device from a manufacturer to circumvent sales channels to sell or resell it to the customer at a lower price. Maintaining the authenticity of a device is vital for customer assurance and to ensure the reliability of the device itself. For example, a device may be used to support critical network functions such as in power grid applications requiring an expected guaranteed level of performance. The unauthenticated device can be susceptible to security intrusions that can degrade the device's performance and may result in network outages. Other examples caused by an unauthenticated or counterfeit device are operational issues at customer ends that can result from software updates during a device's lifecycle, and which can also negatively and unfairly affect a vendor's reputation.

In various embodiments, it is desired to enable systems and methods to be implemented to enhance the tamper resistance of a device by continuously monitoring chip operations (e.g., of an Integrated Circuit (IC) (e.g., ASIC) or other device) where the hardware is secured by a Root-Of-Trust (ROT).

In response to an unauthorized intrusion to discover a decrypted package that has been decrypted by a secret key and stored in memory, it is desired to actively respond to an attempted attack by deleting or overwriting the secret key used to decrypt the package (e.g., the proprietary code stored in memory) and/or to continuously impair the chip (e.g., ASIC) upon detecting of the attack and/or damage to a package.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates an exemplary flowchart of an example method of enabling the tamper resistance process in response to an attack according to some embodiments.

DESCRIPTION OF EXAMPLE EMBODIMENTS

Overview

Figure 1:
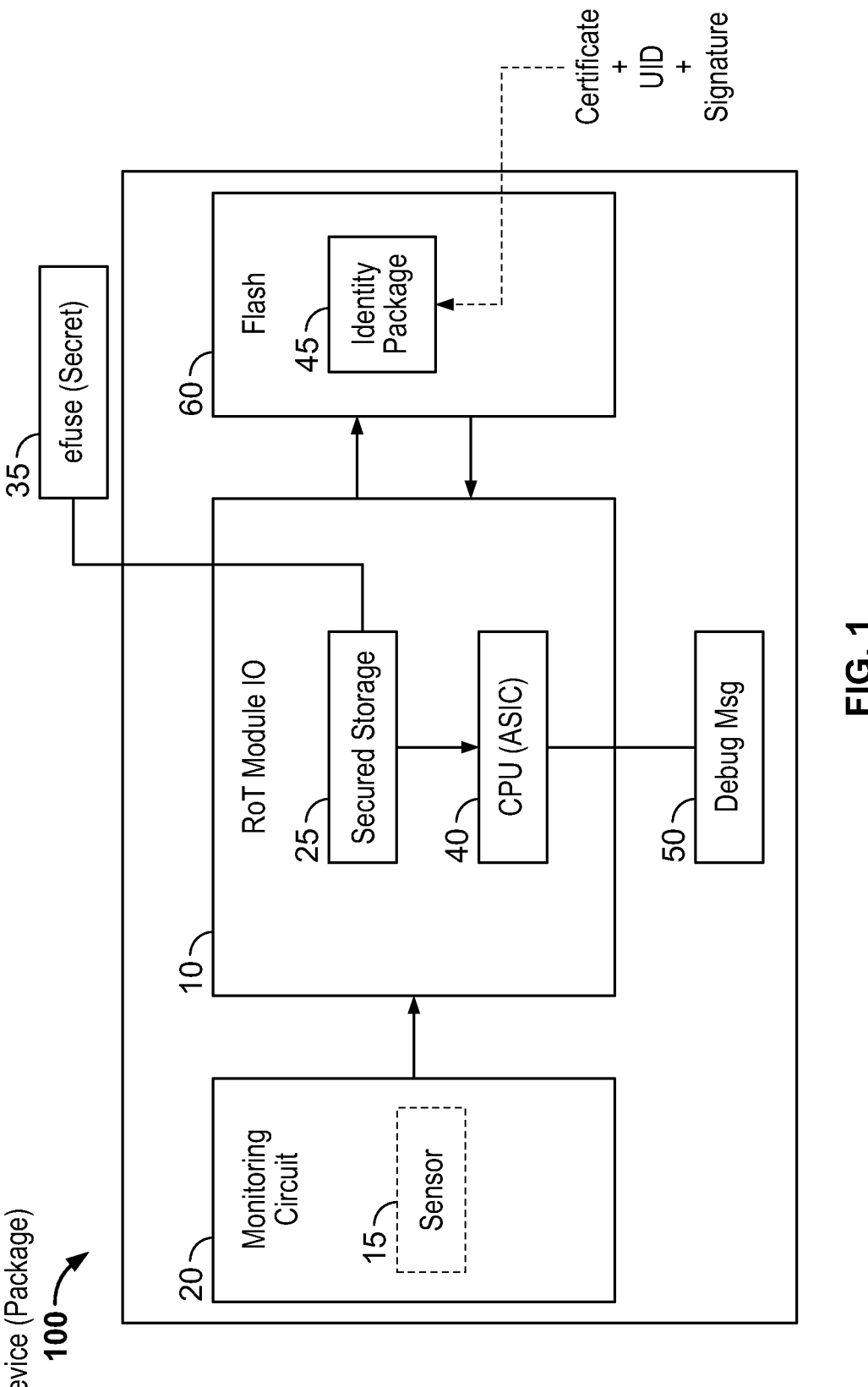
FIG. 1 illustrates an exemplary high-level diagram of a device or package of a device with an integrated circuit (IC) that is configured to be operably coupled to monitoring circuitry that may include or be coupled to a sensor according to some embodiments.

This disclosure describes techniques for implementing a method for tamper-resistant hardware that uses firmware with a Root-Of-Trust (ROT) for tamper protection by continuously monitoring an Integrated Circuit (IC) (e.g., such as an Application-Specific Integrated Circuit (ASIC)) or other device, to respond to an unauthorized attempt (an attack or intrusion) to expose or discover proprietary instructions or code of the device by performing one or more operations to erase or overwrite the proprietary code (e.g., instructional sets) or other secrets that is or may be contained in a memory associated or configured with the device.

In some embodiments, the present disclosure provides methods and systems for the continuous impairment of the ASIC upon detecting a damaged package, which uses the RoT impairment logic as a tamper response, and the Physical Unclonable Functions (PUFs) to protect the chip's encrypted keys. For example, the PUFs do not provide encryption keys if the PUFs detect that a device is being probed using a light sensor or other detection devices as a part of a chip or package configuration to prevent hacking based on photography-based attacks or optical attacks to extract the chip secrets. In some embodiments, systems, and methods are provided for augmenting existing chip security by voltage, clocking, temperature, and/or glitch detectors.

In some embodiments, methods and systems are provided for decrypting, by the Root-Of-Trust (ROT) module, an identity package that resides in a non-volatile memory coupled to an Integrated Circuit (IC) using a secret accessed by the ROT module wherein the identity package is configured in a decrypted state at the non-volatile memory by use of the secret by the ROT module. The ROT module based on monitoring data from at least one sensor operably coupled to the ROT module, may discover that an attack is at least being attempted on a package of the IC. In response to the attack, the ROT module may determine whether a debug package is present, and if the debug package is not present, the ROT module may be configured to execute a tamper resistance process to prevent the use of the secret by the ROT module so that the identity package is prevented from being placed or to remain in a decrypted state in the non-volatile memory of the IC. In some embodiments, the secret is a secret key used to decrypt the identity package. The ROT module is configured to determine whether an attack is being attempted on the IC during at least one of the powering on of the IC or ongoing operations of the IC. In some embodiments, the ROT module is configured to determine whether an attack on the IC is being attempted during at least powering on of the IC based on data from at least one sensor that is configured to monitor damage or an intrusion to a package in which the IC is disposed. The tamper resistance process may include executing a script or algorithm by the ROT module to overwrite, erase, delete, or change one or more bits of the secret key to prevent the ROT module from decrypting the identity package in the non-volatile memory. The tamper resistance process may include an active process that is initiated upon the discovery of at least one of the damage or an intrusion to the package. the attack may be a glitching type attack during at least a powering on or powering down of the IC, or during ongoing operations of the IC. By executing a script or algorithm, by the ROT module to at least overwrite one or more bits of the secret key, the identity package is caused to be in a non-decrypted state in the non-volatile memory. The monitoring of the IC may include continuous monitoring of one or more features in the ongoing operations of the IC. The IC may be a System-On-a-Chip (SOC) or an Application-Specific Integrated Circuit (ASIC). The secret key may have at least one built-in key accessed by the ROT module which is an electrically programmable fuse (eFuse) configured during manufacturing of the IC.

In some embodiments, methods, and systems are enabled in a zero-trust environment with a light-weight control that may be implemented. The methods and systems configured may be implemented to target the use of the ROT for implementing a continuous monitoring system of the operations of at least the IC and to enforce a policy based on the operations that are currently being performed. For instance, if the operations are out of line with a defined policy, the ROT is enabled to disable certain features or impair the IC to not perform certain functionalities.

In some embodiments, methods, and systems are provided for monitoring an Integrated Circuit (IC) that is actuated by a Root-Of-Trust (ROT) module operably configured with the IC using a monitoring process to monitor one or more features being performed in ongoing operations of the IC in accordance with a policy. The ROT module may receive data such as policy data that defines in part the policy of a specification that may include one or more of the features being performed in the ongoing operations of the IC. The policy data may be installed in memory at the IC accessible by the ROT module or may be received from a host and accessed by the ROT module. The ROT module may apply a validating of the data by using instructional code from firmware accessed by the ROT module and by using at least one built-in key of a plurality of built-in keys retrieved from a secure storage. The ROT module may determine based in part on the validation of data received, whether one or more features that are being performed in ongoing operations of the IC comply with the policy. The ROT module may apply an impairing process to impair one or more features being performed, to respond to a determination that the policy is not in compliance, and to attempt to place the performance of ongoing operations of the IC in compliance with the policy.

In some embodiments, the ROT module may actuate the monitoring process during a boot-up of the IC, or in ongoing operations of the IC. The monitoring process may be performed in a continuous monitoring manner to monitor one or more features or may be performed in a periodic monitoring manner to monitor one or more features in the ongoing operations of the IC.

In some embodiments, the monitoring process may be configured as a passive monitoring process or a non-passive monitoring process that is actuable by the ROT module.

In some embodiments, the monitoring process may be executed using an algorithm, a script, or routine that is actuable by a request or call from the ROT module, and the algorithm, script, or routine may be configured to enable the monitoring of one or more features being performed in ongoing operations of the IC.

In some embodiments, the ROT module is configured to receive at least one of new data or updated data related to the policy from a host during a boot-up feature of the IC or in ongoing operations of the IC for determining compliance with features being performed by the IC.

In some embodiments, the impairing process that is implemented includes impairing one or more features of the IC to configure the IC to operate in a different mode such as a lightweight mode, which may include a subset of the features being performed in which the subset of features being performed comply with the policy. The data related to the policy can be locally encrypted and stored, or cloud accessible, and is readable by firmware stored in memory by the ROT module.

In some embodiments, the method is described that uses a ROT to enable monitoring processes that continuously monitor the device operations to impair functionals or operations that are not within a policy, license, or specification subscribed. This includes monitoring the operations of the IC or other devices and enforcing a certain policy based on the operations being performed. As mentioned, if the operations are out of line with a defined policy, the ROT disables certain features or impairs the IC. The ROT, as an example, can monitor the clock to determine the frequency (frequency monitor), and if the clock is out of line with the desired frequency, then the ROT takes various actions such as resetting the device. The ROT is configured in an isolated execution environment within the IC that boots from an immutable code in mask Read Only Memory (ROM) that is cryptographically personalized to each ASIC. It can be configured to prevent the IC from performing its core function until two requirements are met, by the ROT (e.g., prevent switching packets operations). The two requirements are as follows: A First Requirement is that the ROT is able to find and authenticate an issued identity in the form of a certificate (e.g.: X.509 certificate, similar to a Secure Unique Device Identifier (SUDI) certificate and conveys the fact that it is an ASIC identity rather than a system identity, stored in the IC (or ASIC) companion Serial Peripheral Interface (SPI) flash). The Second Requirement is that the ROT is able to verify that the certificate is on the same Printed Circuit Board Assembly (PCBA) as a Trust Anchor Module (TAM) and is paired with the PCBA at the time of manufacture. The verification is achieved by a host software facilitating a challenge/response from the ASIC ROT to the system TAM for the SUDI certificate. The SUDI certificate contains all ASIC Electronic Chip IDs (ECIDs) such that the ASIC ROT authenticates it and extracts the ECID from the SUDI certificate to verify its consistency with a local ECID.

In some embodiments, one or more methods may be established for the continuous monitoring of one or more built features of the ASIC utilizing a Root of Trust (ROT) code in a zero-trust environment of a device that securely configures the ASIC based on one or more licensed codes. For example, The ROT code may receive a licensing code from a host during bootup or may be configured one time as part of an authenticated ROT forward (firmware) image. The firmware with the ROT code may then validate the incoming licensing code with built-in keys from a secure storage such as a fuse box. The ROT code may configure a set of on-chip resources to achieve a desired licensing (e.g., it may disable hardware-accelerated crypto so that licensed code-based IC or ASIC can be exported), and the ROT code may continuously or periodically monitor and enforce the characteristics of the ASIC operations (e.g., enforce licensed bandwidth, and/or enable/disable crypto acceleration). In some embodiments, the evaluation of the license and enforcement occurs using the same isolated trusted code segment where a passive device evaluates the license with usage and operates an operating system (OS).

In some embodiment, the ROT code is implemented to enforce in the hardware of a system-on-chip, the licensed code using cryptographic controls. For example, the same die or package containing the IC or ASIC and/or system-of-chip are controlled by eFuses that are burnt during the manufacturing process of the die. The eFuses may be configured to contain different part numbers and/or other part-specific identifiers (customer ID or versions) to enable or disable resources for one or more feature sets of each IC, ASIC, or system-of-chip configuration. For example, the features of a feature set are controlled by the CPU-specific ROT and firmware with an authentication built-in key that is securely stored. The features are controlled by eFuses by physically disabling features of the IC, ASIC, or system-of-chip without software. This enables different IC or ASIC packages to be used based on each license or policy subscribed.

Additionally, the techniques described in this disclosure may be performed as a method and/or by a system having non-transitory computer-readable media storing computer-executable instructions that, when executed by one or more processors, perform the techniques described above.

EXAMPLE EMBODIMENTS

In the examples described herein, a hardware root-of-trust (HWROT) may be enabled without a trusted platform (TPM) where the HWROT implements features of the IC using licensing data received from a host or configured in memory that is validated by the eFuse built-in keys. The licensed specification of the IC is enabled with the ROT which is equipped in the IC with an internal HWROT. The HWROT uses a read-only platform with programmed read-only cryptographic keys that enable features such as a secure boot with firmware.

In some embodiments, the present disclosure describes methods and systems for continuous impairment of an Application-Specific Integrated Circuit (ASIC) upon detecting a damaged package. In some examples, the disclosure describes methods and systems to implement an ASIC Root of Trust (ROT) which operates in a zero-trust environment and that never turns off. The ASIC ROT may assist in creating a random key unique to the device, personalize the device, and authenticate with the device power-up. A hardware-level ROT, unique device identity, and validation of all levels of software during startup establish a chain of trust for the device. Utilization of the ROT as a building block provides complete flexibility in the device for continuous monitoring, validation, and impairment.

In some embodiments, the firmware of the secure boot may be configured to enable a monitoring script or software that can monitor operations and operating features of the IC during ongoing operations and ensure that certain features during operations conform to a licensed specification that is subscribed or implemented for the IC.

In some embodiments, the IC may be configured in a package that can operate in one or more different modes of operation that are dependent on licensed features or impaired features of a specification that is being subscribed. For example, the package may be configured to operate in different modes of operation based on the licensed features in accordance with a specification that defines the operations of the IC.

In some embodiments, an eFuse mechanism can be associated with different licensing information such as part numbers for configuring different licensed specifications of IC; for example, to enable a subset of feature sets during ongoing operations of the IC.

In some embodiments, to prevent attacks, physically unclonable functions (PUFs) primitive may be used for authentication and secret key storage without requiring secured EEPROMs and associated costly hardware. This is possible because instead of storing codes in the digital memory, PUFs derive a secret from the physical characteristics of the integrated circuit (IC).

In some embodiments, enforcement of the license is enabled in hardware using cryptographic controls, where the same package (e.g., the package doesn't change) features that are controlled by the license which is monitored during ongoing operations and uses eFuse containing different parts numbers and/or other means (like customer ID or version) to enable the features (which is more secure than using a Software Development Kit (SDK) to configure the keys). The features are controlled by the eFuses by physically disabling the features without software that is secured (though may be deemed less flexible). The features are controlled by the ROT and the firmware with an authenticated feature key (that is both secure and flexible), and different packages are used based on different licenses (e.g., more like binning, partial goods, combination, etc.).

In some embodiments, eFuses, a True Random Number Generator, and a CPU (e.g., ARC®) complex with ROM are configured to secure the license (or a license code in the ROT).

In some embodiments, device-tracking can be enabled with the Root of Trust(ROT) in silicon devices. The ROT is at no time turned off and operates in a zero-trust environment (e.g., in an isolated ROT CPU complex contained in the IC). The IC's ROT assists in generating a random key that is both unique and device-specific and can be used to authenticate the device during the device power-up. The process flow also entails enabling an eFuse mechanism with a true random number generator (TRNG) based mechanisms to generate unique and reproducible device-specific random numbers for crypto security encryption.

In some embodiments, the Root of Trust (ROT) is an isolated executable code within the IC that boots from immutable code in mask ROM and is cryptographically personalized to an IC such as an ASIC and can prevent the ASIC from performing its core function (e.g., switching packets) until certain requirements are met. The ROT must be able to find and authenticate an issued identity in the form of an X.509 certificate, similar to a Secure Unique Device Identifier (SUDI) certificate in format but different in content. The ASIC identity rather than a system identity is stored in the ASIC's companion SPI flash. This is enabled so that if the ASIC is lost or stolen in the supply chain before it is mounted on PCBs and provisioned with identities, it still cannot be enabled (e.g., used by a counterfeiter). In some embodiments, the ROT code is configured to be able to verify that it is on the same PCBA as a Trust Anchor and that it was paired at the time of manufacture. This is achieved by the host software facilitating a challenge/response from the ASIC ROT to the system Trust Anchor module for the latter's SUDI certificate, which contains all ASIC ECIDs in the same system as provisioned during manufacturing, such that the ASIC ROT can authenticate it and subsequently extract the ECID from the SUDI cert to verify its consistency with its local ECID. If these two cryptographic checks pass, a Silicon ASIC with an ROT will be enabled to serve its core function.

In some embodiments, because the IC has built-in ROT functionality, it can be used to enable cryptography to evaluate itself in a required operability including what features it should constrain, etc. The ROT can control the IC functionality and can be used to constrain or enable IC functionalities based on licenses. The ROT receives a license (or code) from a host or connected platform during boot-up, or the license (or policy) is provisioned when the IC is shipped. The licensing code is implemented during bootup and can be time or cycle-configured depending on the requirements. In some embodiments, the license code can be a one-time code that is used as part of the authentication or provisioning of the IC. For example, as part of the authentication ROT forward image. The ROT firmware can validate the code with built-in keys or can be configured to send a request to a third-party site for validation. The ROT during the bootup can automatically configure functions, parameters, and resources on the IC (e.g., the chip) to achieve the requirements of a particular license.

In some embodiments, the ROT can include functions embedded such as a watchdog monitor or timer, to monitor the operational characteristics of components enabled in the ASIC under the license. Also, the ROT can disable functions in the IC based on the license code. For example, the eFuse can be triggered by the ROT for the one-time disablement of functions. The ROT can control the processor throughput, for example, configure higher processing rates dependent on the jurisdiction of use, to abide by respect export regulations. In this case, using the ROT to enable enforcement from an isolated trusted code, is not susceptible to hacking or license subversion. Also, with the ROT, the same package can be used and is not required to be changed with different license codes. The SDK can use eFuse with different part numbers that physically disable IC operational features, but this is less flexible than software that implements controls such as can be configured from the ROT and firmware with an authentication feature. Different packages based on different licenses can also be implemented (e.g., an on-demand configured IC).

Examples described herein also provide a computing device that may include a CPU (e.g., ARC® processor) or ASIC which is isolated and secure non-transitory computer-readable media storing instructions of the ROT that when executed by the processor, cause the processor to perform several operations.

Turning now to the figures, FIG. 1 illustrates an exemplary high-level diagram of a device or package of device 100 with an integrated circuit (IC) (e.g., ASIC or CPU 40) which is configured to be operably coupled to monitoring circuitry 20 that may include or be coupled to a sensor 15, according to some embodiments. The monitoring circuitry 20 is operably coupled to a Root-Of-Trust (ROT) module 10 which the CPU is disposed of as well as a secured storage 25. The ROT module 10 may communicate with the secured storage 25 to access a secret such as a built-in key that is an electrically programmable fuse (eFuse) configured during the manufacture of the device 100. The package of the device or the device 100 is monitored by the monitoring circuitry 20 using the sensor 15 which may be a temperature sensor, an optical sensor, an impendence sensor, or other type of sensor. The sensor 15 can be configured to sense damage to the device or package, an intrusion to the device or package, or an attempt to intrude on the device or package. In response to damage, attempted intrusion, or an intrusion of the device 100 sensed by the sensor 15, data is sent to the ROT module 10. The ROT module 10 via the CPU 40 is configured using an algorithm to determine the likelihood that an attack is about to occur or has occurred to the device 100.

The ROT module 10 is operable coupled to an external or internal non-volatile memory such as a flash memory 60. In implementation, the ROT module 10 uses secret keys to decrypt an identity package 45 that is found in the flash memory 60. The identity packet has information or contains the UID certification plus a signature that is used by the ROT module 10 to validate the device 100 or the ASIC (e.g., CPU 40) for compliance in operations with a policy. In some embodiments, the ROT module 10 performs a validation check during a startup or powering on of the ASIC or device 100. In other instances, the validation check is performed on a continuous or periodic basis during device operations to ensure that the device 100 remains in compliance.

In implementation, a glitching fault or other electrical interruption may be detected by the sensor 15, and data of this fault or interruption is sent to the CPU 40. In instances, based on the data received, the CPU 40 may determine that the fault or interruption is being caused by an attack or an attempt to attack the CPU 40 or ASIC to discover the secret (e.g., secret keys) or capture data of identity package 45 that is in the flash 60 in a decrypted state. As an example, an attacker may attempt to disconnect the Flash 60 and have access to a decrypted identity package, and in other instances, may even have access to the contents of the identity package 45 because of its decrypted state whilst in the Flash 60.

To prevent access to the identity package 45, and/or the secret contained with the identity package 45, the CPU 40 (or ROT firmware) may initiate a tamper resistance process as an active response to change the secret. For example, whilst storing a unique identity (e.g., the identity package content) in efuse, the efuse contents may be subject to exposure or observation via microscopy using an electron microscope or like device, and an attacker (e.g., hacker) may gain access to contents about or determine the actual content of a device identity that is used to validate a device 100 or the ASIC in operations. In some embodiments, the attacker may be able to open the package or cause an intrusion or damage to the package to enable examination of the package with the secret and/or identity package in a decrypted state. In other words, the tamper resistance process prevents an attacker from entertaining a glitching attack to circumvent the eFuse key encryption, and to extract encrypted content that is in a decrypted state at the flash 60 during the device powering on or during ongoing operations of the device.

In some embodiments, the CPU 40 (or ROT firmware) may check whether a debug/RMA message 50 has been issued (through a secure channel) prior to initiating the tamper resistance process to ensure that the device 10 is being attacked or subject to an unauthorized intrusion. If the debug/RMA package or message is present then the CPU 40 does not proceed with the tamper resistance process. If the debug/RMA package or message is not present, then the ROT module 10 or the CPU 40 initiates and executes a script to cause or prevent the identity package 45 from being decrypted or remaining in a decrypted state at the flash 60. For example, if the debug/RMA package is not present, the CPU 40 or ROT module 10 may send a signal to overwrite any number of 0 efuse bits of the secret key to 1. The result of the overwrite is that the secret is lost and therefore the ROT module 10 is not able to decrypt the identity package, and hence the ROT module 10 would cause the device 100 or other device coupled that relies on the identity package 45 for validation not to function.

In some embodiments, the tamper resistance process may apply a script or algorithm to delete or erase bits of the secret key or insert bits into the secret to render the secret key invalid. In some instances, a signal may be applied to overwrite one, any number of, or all of the efuse bits of the secret key to render the secret key unusable and to prevent the contents of the identity package 45 and any other proprietary information from being exposed or accessed.

In some embodiments, the security layer is prevented from being bypassed provided by the ROT even though the secret has been used to decrypt the identity package 45 that is at the flash 60 because the package is being monitored for an attack. That is, the CPU 40 determines whether a fault or interruption is being caused as an attempt or prelude to a potential attack to discover the secret (e.g., secret keys or other proprietary information) that the ROT module 10 uses to decrypt an identity package 45 that may reside, remain, or is stored in a flash 60 of the device 100. The identity packet has information about the UID certification and also a signature that is used by the ROT module 10 to validate the device 100 or the ASIC 40 (e.g., CPU). The ROT module determines based on a debug bit rather than the security message whether the device is being attacked.

In some embodiments, the validation process or function being performed by the ROT module 10 includes using the secret from the efuse as a secret key to encrypt the identity package 45 that has a certificate with the UID plus the signature, the UID is unique to the ASIC and the attached signature contains properties unique to the particular ASIC, which is then encrypted using the secret key. In some instances, the CPU 40 executes code that can decrypt the identity package 45 using the secret key to readout the UID and compare it to the certificate.

If the ASIC is under attack, by blanking out the secret using the tamper resistance process, then where another ASIC were to be acquired for unauthorized use, with another UID. UID, the replicated ASIC would not be able to function.

In some embodiments, an active resistance tamper process is implemented to protect an attack such as a glitching attack that includes a step-by-step response in which the glitch attempts to cause the CPU 40 to exit out of the flash 60 (or other memory such as SRAM), and to keep the secret in the flash 60 or SRAM by halting the CPU 40 operation. The active resistance response is activated in response to the glitch, and immediately protects the identity package 45 from release in a decrypted state based on an independent checking of the debug package, even if the CPU 40 exits out of its processing steps, the secret is blanked and is not accessible.

The active resistance tamper process determines if the ASIC is attacked and if the attack is a glitching attack that interrupts the execution of the instructions that occur one by one (e.g. if there is a glitch used to interrupt the clocking frequency of the ASIC). In an example attack, the attacker may cause the CPU to exit out of accessing the SRAM if its operations are being halted. This may cause the secret and/or decrypted package to be in the SRAM, which can enable the attacker to reconnect it to a counterfeit chip thereby bypassing the security layer of the ROT.

In some examples, after a power-up, the CPU 40 may execute hardwired instructions from accessible memory that initializes the setting of an ASIC and fetches a bootloader from the Flash 45 (NAND or NOR flash) which the bootloader code is decrypted and authenticated by the RoT. The bootloader may be part of a bit stream that is loaded into the Flash 45. The bitstream has been decrypted and authenticated when it is being loaded into the Flash 45.

In some examples, the sensor 15 senses a power glitching attack. For example, the TTE protection is circumvented by glitching the CPU 40 during the power-up phase, in order to interfere with the security mechanism. Correct timing is attempted to be identified by the glitching to disable a bootloader, as the bootloader trigger cannot be synchronized to a bootloader command to complete the booting process. In such instances, if the process is halted, the secret key or identity package may be contained and compromised in the Flash 45.

The glitch attack is initiated to get the ROT firmware to a state where it has secrets in memory (e.g., in flash) and processing is halted. A light sensor on the die. The secrets are loaded into SRAM that may be battery-backed. In such a case, even when the system is not powered on or not powered up when the attacker tampers into the chip, it will get logged using power provided by the battery into the attacked nonvolatile memory. When the package is opened for probing, the light sensor will flag ROT firmware (fW) to take action.

The ROT firmware (fW) initiates a tamper response to protect the secure keys. The ROT relies on a secret key (e.g., a private key) stored in the eFuse to encrypt and decrypt an identity package to ascertain whether the ASIC is attested to operate per a policy. In instances, the ROT may check the presence of a debug/RMA package of a debug message 50. If the debug/RMA package is available and is authenticated, then the ROT takes no further actions to secure the identity package at the flash 45. If not, the ROT is configured to execute a script to overwrite the 0 efuse bits to 1 contained in the identity package at the flash 45. By overwriting the efuse bits contained in the flash 45, the secret key is not exposed and protected. The ROT can be configured to perform other manipulations of the secret key bit data other than overwriting certain bits such as reordering the bits, blanking the bits, or changing the bits. In other words, it is contemplated that a number of schemes can be implemented to prevent exposure of the bits.

Figure 2:
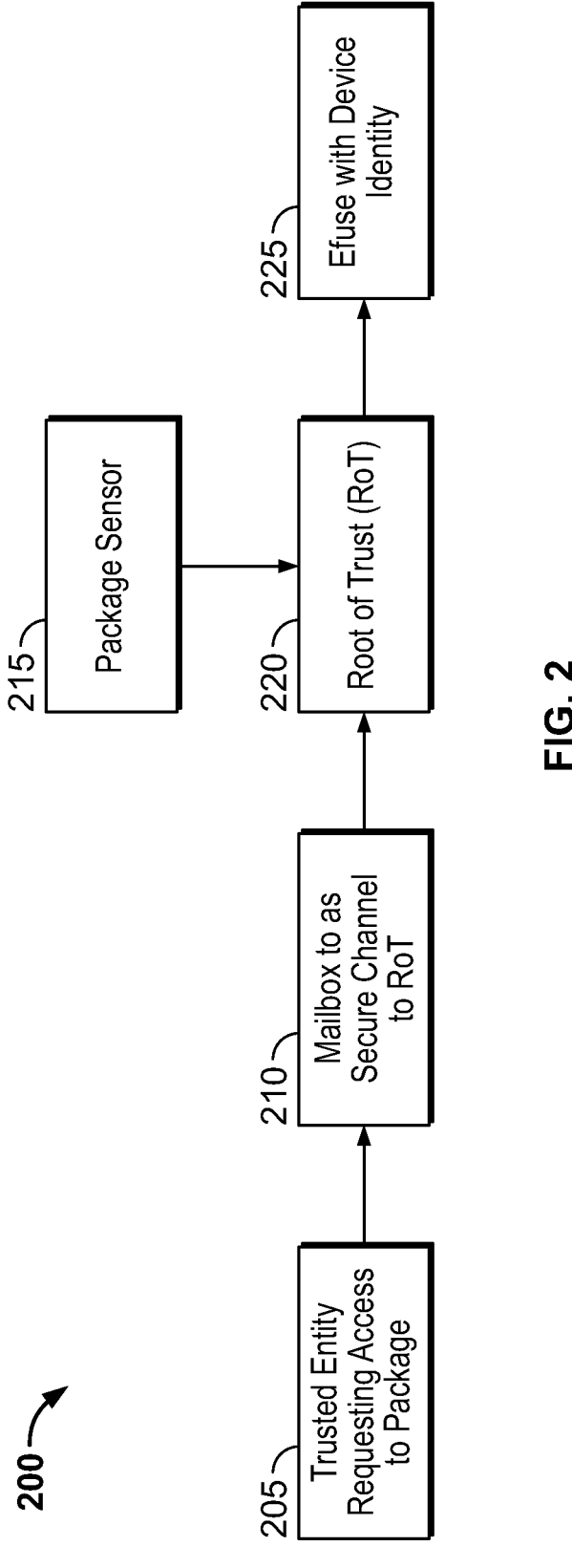
FIG. 2 illustrates an exemplary block diagram of the flow of the trusted entity requesting access to the identity package to validate the device identity according to some embodiments.

FIG. 2 illustrates an exemplary block diagram of the flow of the trusted entity requesting access to the identity package to validate the device identity according to some embodiments. In FIG. 2, block diagram 200 illustrates a system of protection against attacks that involve the opening of a device or package of the device 100 (e.g., an opening of the ASIC package) in which a sensor 15 (in FIG. 1) is configured under or integrated with the package and is capable of detecting whether the package is being opened by an outside entity. In an implementation, sensor 15 may be a light or photosensitive type sensor. In FIG. 2, at block 205, the security solution is configured with a trusted entity requesting access to the package. At block 210, a mailbox is configured as a secure channel to receive a message such as a Debug/RMS message 50 by the ROT module 10. At block 220, the ROT module 10 receives input data from the package sensor of block 215. At block 225, the efuse encrypts the device identity by the ROT. In some embodiments, the security solution is provided by a processor (e.g., CPU 40) of the ROT (e.g., ROT module 10) that enables access to the package. In some embodiments, the Root of Trust (ROT) module 10 operates upon activation of the device 100 (e.g., when power is received by the ASIC) so that an attacker is prevented from bypassing the security layer provided by the ROT. In an implementation, the ROT is configured to execute a complex set of eFuse configuration sequences that enable burning and erasing (e.g., deleting or destroying) of identity-related information from an eFuse if an attack is detected by the sensor 15. The ROT is configured with an intelligent algorithm to process a secure message on a trusted channel and to allow for an event that may allow a trusted entity (e.g., an authorized intrusion) to open the ASIC package. When the package is opened while the device is being powered up, the sensor 15 is configured to send an electrical signal to the CPU 40 (e.g., an on-chip ROT type processor or ASIC) to notify of the event. In response, the ROT module may decide to destroy eFuse content depending on whether it classifies the access as a trusted or untrusted entity that is attempting to open or open the package (e.g., the package of the device 100).

In various embodiments, the security solution prevents attacks that are performed to extract a secret from the IC or ASIC. The security solution prevents an active attack in which an attack is actively probing the IC to extract the secret. The security solution may prevent an attack in which the ROT firmware has caused a state in which the secret is in memory (e.g., SRAM or flash), and the processing is halted. For example, a glitching type attack can cause this particular state. The sensor 15 configured as a light sensor will provide data that flags the ROT module 10 so that its firmware can be configured to take action and initiate a tamper resistance process to overwrite (e.g., to destroy use of, make unusable) or erase the secret in memory.

In some embodiments, the security solution can be applied to counter attacks that may occur during a powering down of the device 100. For example, if a secret is programmed into a battery-backed SRAM, the event can be logged using power provided by the battery into the non-volatile memory that is being probed or attacked. Hence, when the device 100 is powered up and the actual attack is to be performed by the attacker, the ROT module 10 can be configured via the secure channel to access the log and decide not to transfer a secret to the ASIC or memory to prevent release or exposure of the secret to a potential attacker who may be probing the device.

Figure 3:
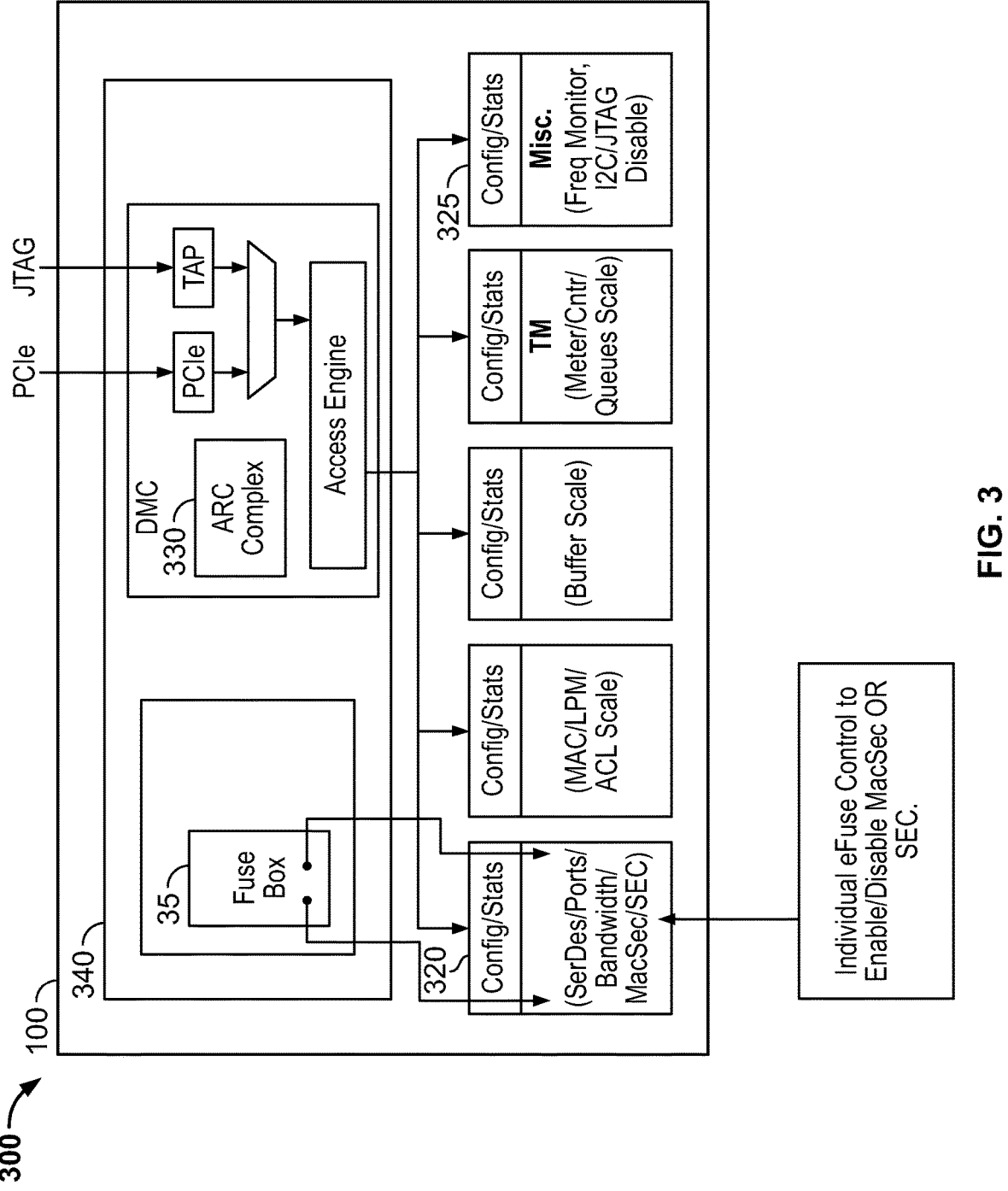
FIG. 3 illustrates an exemplary diagram of different configurations of eFuse controls that enable or disable premium features (i.e., MacSec) of the SOC according to some embodiments.

FIG. 3 illustrates an exemplary diagram of different configurations of eFuse controls that enable or disable premium features (i.e, MacSec (or Sec)) of the SOC 340 according to some embodiments. In FIG. 3, the eFuse mechanism 300 is shown which in an embodiment, is configured in a device 100 manufacturing and is used to establish the device 100 authenticity before traffic is initiated on the device. In some embodiment, the eFuse mechanism 300 is enabled to configure a chip-specific keying material package (CSKMP), that consists of generating device-specific and unique random numbers, which are kept encrypted and used as symmetric keys for device authentication. The device's 100 specific keys are encapsulated in the CSKMP with the vendor-provided public key and may be accessible by a vendor backend in a secured environment. The secure environment can include chip-specific databases that are used to create a chip-level identity information package (CLIIP). In some embodiments, the vendor backend will create a new certification for the device 100 used with a product identifier (Product ID (PID)). In some embodiments, the new certificate will be sent to device 100 and installed in FLASH memory integrated with the IC (e.g., CPU (or ARC® complex) 330) of device 100.

In some embodiments, the eFuse mechanism 300 can be implemented with a one-time programmable (OTP) to control the functionality of resources of a system on a chip (SoC) 40. The eFuse mechanism 300 is programmed to contain one or more secure keys (e.g., built-in keys) contained in the fuse box (efuse 35) during manufacturing and not after production. The eFuse mechanism 300 can itself configure the control of the Media access control security (Mac Sec) for authentication and encryption of traffic over Ethernet on Layer 2 LAN networks (config/stats module (CIFG) 320, and config/stats (Misc.) 325). The eFuse mechanism 300 can ensure that a secure boot mechanism starts its root of trust (ROT) by setting up one or more keys (e.g., a private-public key pair (asymmetric) or also 2 private keys (symmetric)) into the semiconductor device (e.g., device 100) during the manufacturing process of the chip vendor. In some embodiments, the IC (e.g., CPU complex 330) will use different authentication keys where a random number is generated from a true random number generator (TRNG) (non-NIST compliant) and is written in eFuses (e.g., the eFuse mechanism 300) with the assistance of firmware.

In some embodiments, the ROT can monitor the clock (frequency monitor) to determine the clocking frequency of certain ongoing operations, and if the clock is out of line with a frequency that is defined by an operating licensed specification of the IC (e.g., CPU (or ARC® complex) 330).

In some embodiments, other than the built-in keys, the eFuses can be configured to store device security related to control and status bits. These are optional and dependent on the firmware and whether it is required to use the other features.

Figure 4:
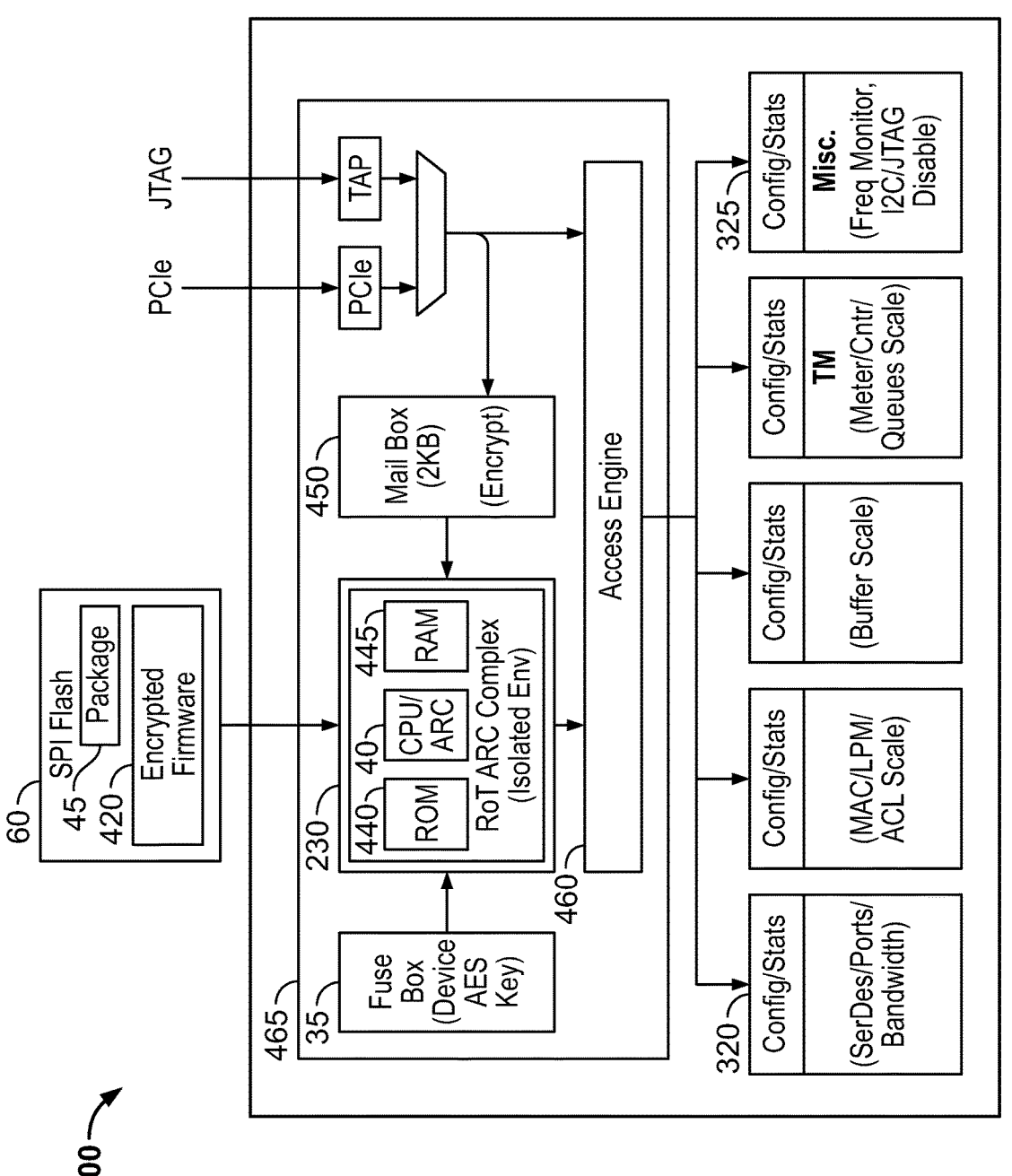
FIG. 4 illustrates an exemplary system architecture diagram of a Root of Trust (ROT) CPU complex that is isolated and encrypted to receive encrypted firmware and to program different device configurations based on the policy, or licensed specification according to some embodiments.

FIG. 4 illustrates an exemplary system architecture diagram of a Root of Trust (ROT) CPU complex that is isolated and encrypted to receive encrypted firmware and to program different device configurations based on the policy, or licensed specification, and operate in accordance with settings configured with eFuse controls that enable or disable various MacSecs/Secs of the SOC or device.

As depicted in FIG. 4, an isolated Root of Trust (ROT) CPU Complex 430 is configured to operate in a zero-trust environment of device 100. In some embodiments, an isolated ROT CPU Complex 430 is configured that provides a security perimeter to protect the CPU (e.g., CPU 40, an ARC® processor), and the IC (e.g., an ASIC), that runs secured firmware 420 (e.g., the ROT firmware) to decrypt the identity package 45 in the runtime memory. In some embodiments, the firmware 420 is encrypted firmware configured with serial peripheral interface (SPI) Flash memory (e.g., the S ash can be used to store a bootable firmware and is explicitly accessible by sending commands from instructions configured in the ROT code). The ROT code may be input during the device manufacturing process and may include information from the digital birth certificate that enables the device 100 (e.g., device enablement information that has been previously programmed into a hardware component during the manufacture of the device 100).

The secure CPU 40 may be programmed so that information based on different licenses or licensed information received from a host can be used for different packages of SOCs 465. The CPU 40 can include specific cryptographic and computational hardware to facilitate the processing of cryptographic information (e.g., the different licensing codes). The secure system (e.g., the isolated ROT CPU Complex 430) can configure the features of the (programmable) device 100 with ROT code executed in secure read-only memory (ROM) 440 and randomly accessible memory (RAM) 445 with the instructed CPU 40 accessing the built-in keys from secured storage of the fuse box 10 to create or monitor multiple final device 100 type configurations. Each of the final device 100 configurations can be identified as having different properties that are continuously monitored and decrypted by the built-in keys.

In implementations, the ROT code can be configured to never be turned off as it operates in a zero-trust environment (e.g., the isolated ROT CPU Complex 230 and received keys eFused from the fuse box 10, and instructions from the mailbox 450 which are encrypted). The ASIC (CPU 40) Root-of-Trust can be configured to assist in creating a random key unique to device 100 that personalizes the device and authenticates the device 100 with the device power-up. The firmware code (from the encrypted firmware 420) from the SPI Flash (e.g., flash 60 of FIG. 1) may be executed by the access engine 460

In some embodiments, the hardware Root of Trust (ROT) code is integrated into the monolithic silicon of the IC (CPU 40) and is an isolated execution environment within the IC that boots from immutable code in mask ROM (440), is cryptographically personalized to each IC (e.g., ASIC), and will prevent the IC from performing its core function (e.g., switching packets) until two requirements are met. First, the ROT code must be able to find and authenticate an identity (e.g., a vendor-based identity) in the form of an X.509 certificate (or like certification), similar to a SUDI certificate in format but different in content in that this is an ASIC identity rather than a system identity and stored in the ASIC's companion Serial Peripheral Interface (SPI) Flash (e.g., Flash 60 of FIG. 1).

In some embodiments, the eFuse and a TRNG-based mechanism are implemented to create a unique and reproducible device-specific random number generator. The SPI Flash (e.g., Flash 60 of FIG. 1) may store the Secure Unique Device Identifier, or SUDI, which is an X.509v3 certificate that maintains the product identifier and serial number. The identity is implemented at manufacturing and is chained to a publicly identifiable root certificate authority. The CPU 40 in the isolated ROT CPU Complex 430 will enable CPU crypto hardware functions with crypto algorithms. SPI Flash (e.g., Flash 60 of FIG. 1) is used to store the intermediate firmware 420 states or control flags. A dedicated CPU Complex (e.g., the isolated ROT CPU Complex 430) is provided for device security (instead of reusing an existing CPU). In some embodiments, the CPU configuration will be the same as other CPUs (of a device) along with a dedicated ROM 440. This ROM 440 will contain SBOOT0 code and will be used to boot up (device-security) CPU 40. The device security of the CPU 40 is configured to execute security code and is secured from side-channel attacks such as through other interfaces to (1) either reset/halt the core or (2) change the program pointer. Also, if needed the firmware 420 can be configured for control and statuses can be stored in a unified data repository or records (UDR) to prevent attacks.

In some embodiments, the SUDI certificate is encrypted with a chip-specific key and stored in SPI Flash (e.g., flash 60 of FIG. 1). The firmware code is provided from SPI Flash, which is authenticated first before use. In some embodiments, the implementation of device 100 is by authentication through mailbox 450 for some devices (devices without an SPI master interface).

Figure 5:
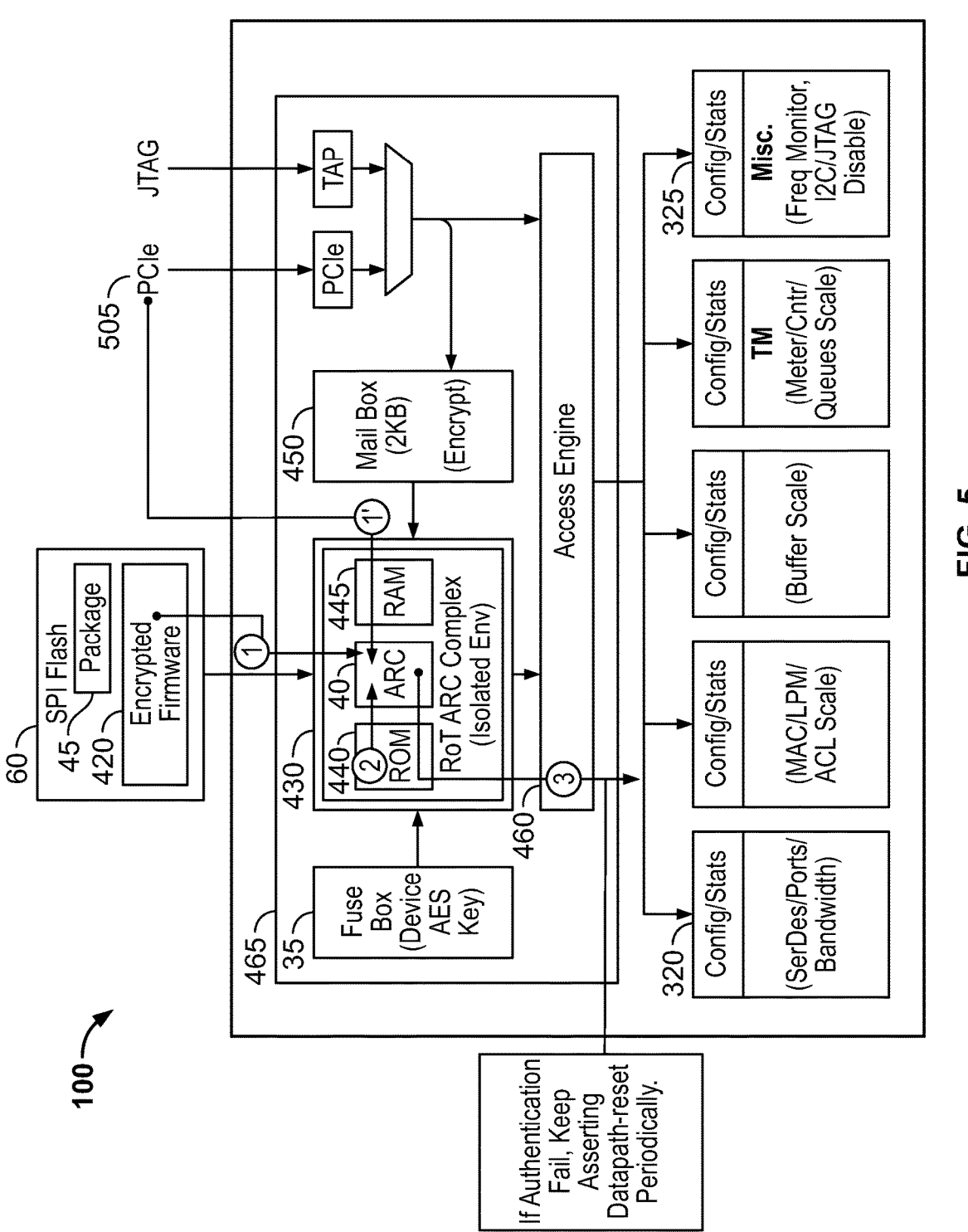
FIG. 5 illustrates an exemplary diagram that includes an authentication (or validation) process for authenticating or validating the operability of the device 100 according to some embodiments.

FIG. 5 illustrates an exemplary diagram that includes an authentication (or validation) process for authenticating or validating the operability of the device 100 according to some embodiments. In FIG. 5, at step 1, the peripheral connect interface express (PCIe) 505 via 1', or the firmware provides code for authentication and/or validation of operating features configured with the device before or upon the device being enabled, or during a boot procedure. In step 2, the built-in keys from the fuse box are read by the ROT, and then in step 3, the CPU 40 authenticates (or validates) and decrypts the firmware code (from the encrypted firmware 420) from the SPI Flash (e.g., flash 60 of FIG. 1) to execute the firmware code at the access engine 460. If this authentication fails, the ROT will reset the data path and retry the authentication or validation operation continuously or periodically or proceed to impair certain functionality of the IC.

Figure 6:
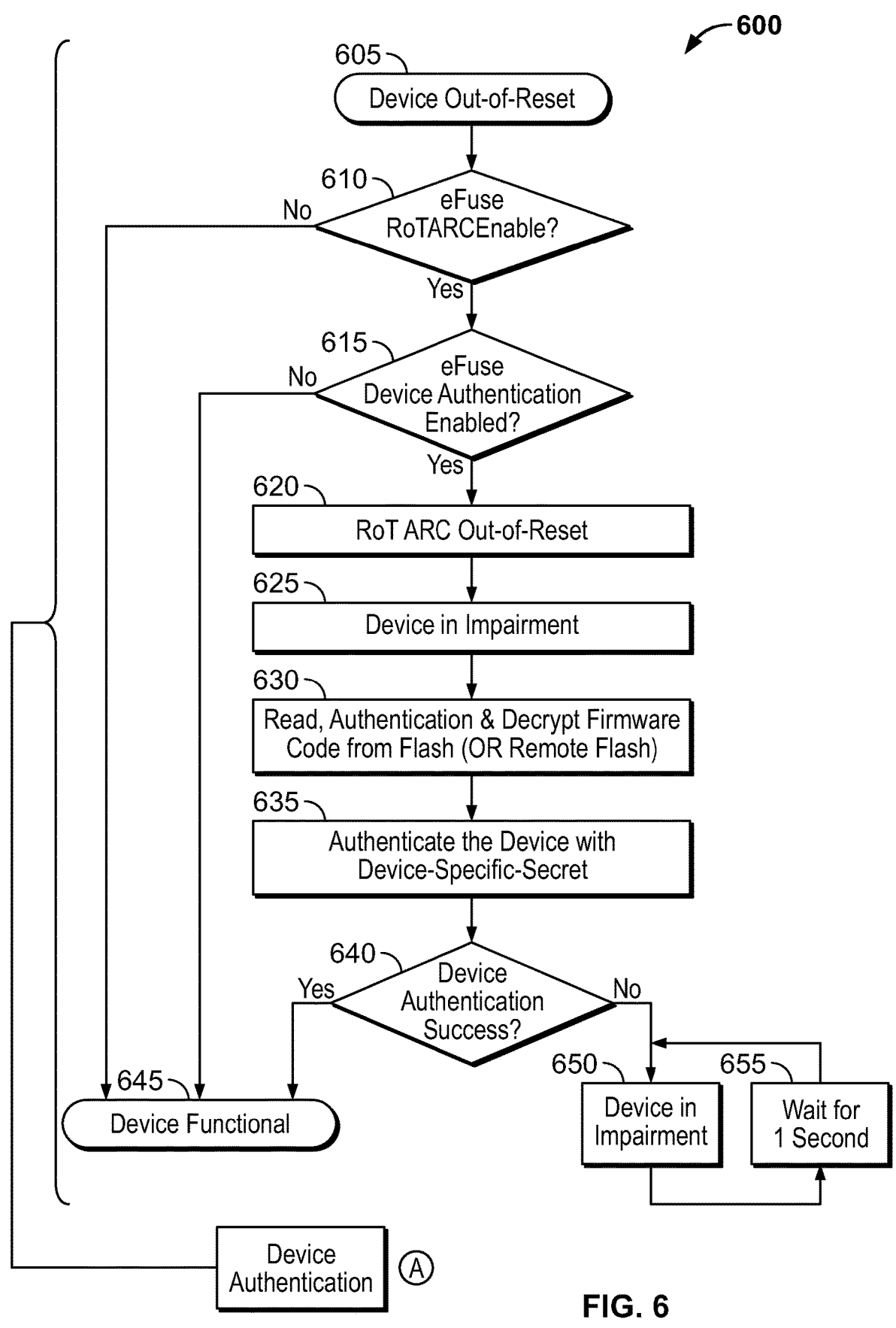
FIG. 6 illustrates an exemplary flow diagram of an authentication and validation process using the ROT on the device according to some embodiments.

FIG. 6 illustrates an exemplary flow diagram of an authentication and validation process using the ROT on the device according to some embodiments. In FIG. 6, in process 600 for the device authentication, at step 605, device 100 is initially in an out-of-reset status. Also, included in the authentication step 605, is a validation of the features and functionalities of the IC complies with a policy defined by a specification in use or license that is installed or being subscribed by the device for ongoing operations.

At step 610, the eFuse mechanism for the device authentication "A" is enabled (e.g., the eFuse ROT CPU is enabled or not?). If the eFuse device authentication is enabled then at step 620, the ROT CPU is out of reset. At step 625, the device impairment is disabled or interrupted to allow for the device ATE/qualification access to be completed. At step 630, it is configured to read, authenticate, and decrypt using firmware code from the Flash memory (or remote Flash memory) takes place. At step 635, the device is authenticated with the Device-Specific-Secret. At step 640, the device authentication is checked, if it is successful then at

645 the device is enabled, else at step 650, the device is placed in impairment, and a wait period 655 is triggered of about 1 second or other desired time period. If at step 610, the eFuse ROT CPU is not enabled, or the eFuse device authentication is not enabled at 615, then the flow continues to step 645, and the device is functional. In other embodiments, with continuous monitoring, the device may be placed in impairment for certain functionalities or operations semi-permanently, or permanently during the lifetime of operation of the IC as a safeguard to future tampering or attempts to tamper with the IC.

Figure 7:
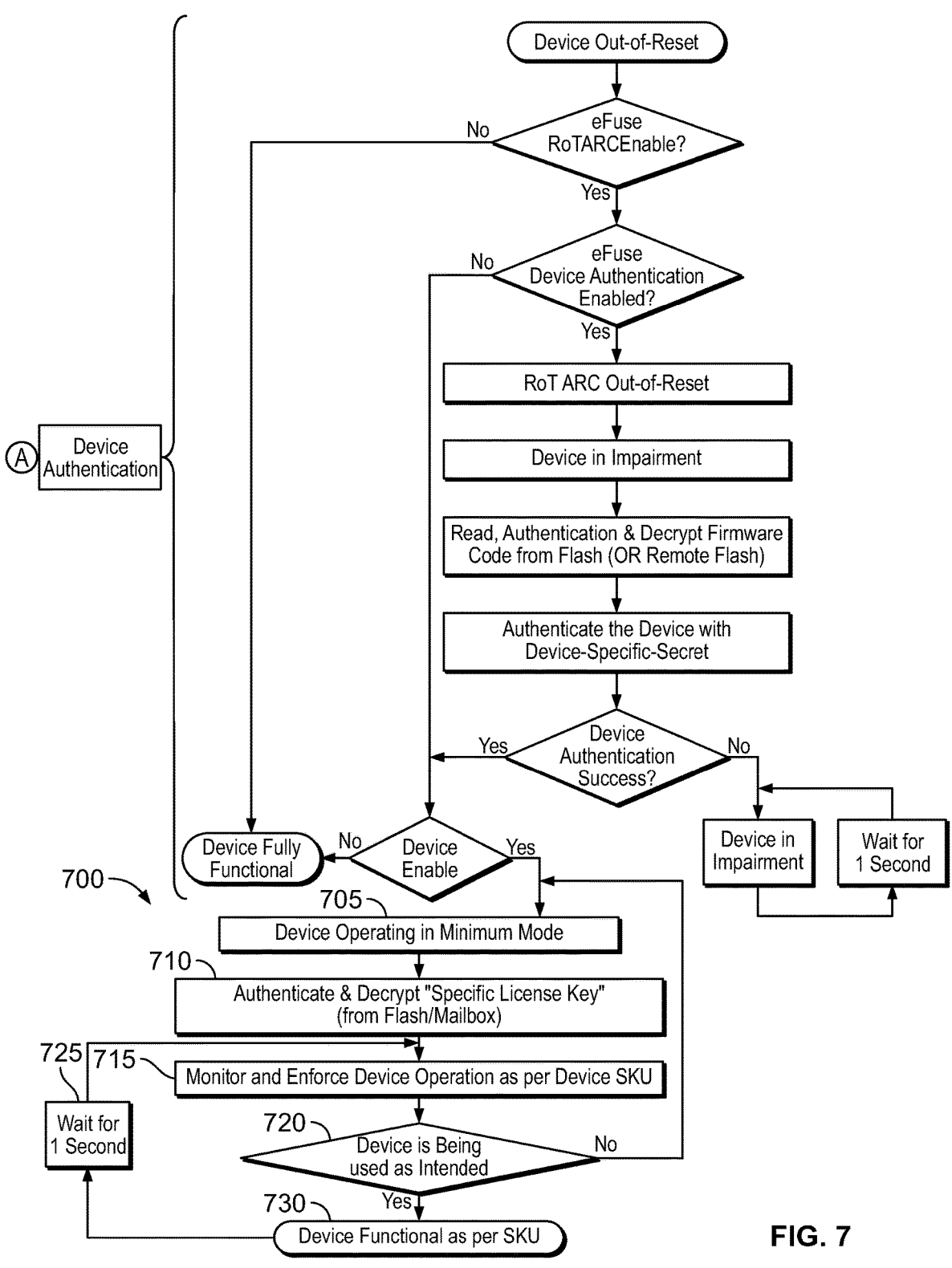
FIG. 7 illustrates an exemplary diagram of a flow of the ongoing operational monitoring and determining of the IC feature configurations for the device authentication according to some embodiments.

FIG. 7 illustrates an exemplary diagram of a flow of the ongoing operational monitoring and determining of the IC feature configurations for the device authentication according to some embodiments. In FIG. 7, flow chart 700 illustrates a device 100 that is productized with multiple variations of a crypto feature enabled, overall device throughput (operating frequency), number of ser/des/ethernet ports and speeds, and MAC/LPM/ACL queues, etc. . . . The different licensed configurations that are enabled can be created with the device 100 and IC/ASIC features enabled to provide feature variations that are decided per a policy without preplanning during production.

In some instances, the delivery of authenticated and encrypted firmware code to enable/disable features even in a zero-trust environment, and the device variation on the same IC/ASIC in use without device changes can be provided by the use of continuous or periodic monitoring of ongoing operations of the IC by the ROT. Since the eFuse is enabled for built-in key authentications, and not for controls, the eFuse-based controls are not used, and the ASIC features of the device can be implemented on demand. In FIG. 7, after the device is enabled and functional via the authentication "(A)" and can be considered a device not impaired and enabled, then at step 705, the device is placed in operation with a minimum, default, or complete mode of operation.

At step 710, an authenticate and decrypt operation is applied using a specific license key received from the SPI Flash (e.g., flash 60 of FIG. 1) during the continuous monitoring mode of operation of the ROT module of IC features that have been enabled. At step 715, the ROT monitors and enforces device operation for compliance with the policy or license used in ongoing operations of the IC. The ROT determines at step 720 if the device is operating or used as intended if not then the flow reverts to reauthenticate the device. If it is (e.g., used as intended), then at step 730 the device is allowed to operate as determined per a particular policy or license, and after a period of time (e.g., at step 725, for 1 sec or other desired period), the device is monitored, and operation is enforced (cyclically) per its license or policy. The cycle repeats as long as the device operates under a particular license or policy. In this way, device security is achieved, and compliance with a policy-specific operation is enabled without device tracking. Also, the license-specific key can be sent through the PCIe which is locally stored on the customer's local host along with its policy or specification defining compliance of ongoing operations of the IC. Also, the policy can be enabled by enabling all the features without the need for license-specific keys, a license-specific key per device, and a license-specific key per group of devices (e.g., per customer) may be enabled for allowing certain features or impairing certain features during modes of operation.

FIG. 8 illustrates an exemplary flowchart 800 of an example method of enabling the tamper resistance process in response to an attack according to some embodiments. The flowchart illustrates a system of protection against attacks that involve the opening of a device or package of the device 100 (e.g., an opening of the ASIC package) in which a sensor 15 (in FIG. 1) is configured under or integrated with the package and is capable of detecting whether an outside entity is opening the package (e.g., causing an attack on the package).

At step 810, the security solution is configured with a trusted entity requesting access to the package. The ROT module 10 is configured to decrypt an identity package that resides in a non-volatile memory of the IC using a secret accessed by the ROT module 10. The identity package is decrypted using a secret key that is accessed by the ROT module 10. In some embodiments, the ROT module 10 may communicate with the secured storage 25 to access a secret such as a built-in key that is an electrically programmable fuse (eFuse) configured during the manufacture of the device 100. The package of the device or the device 100 is monitored by the monitoring circuitry 20 using the sensor 15 which may be a temperature sensor, an optical sensor, an impendence sensor, or other type of sensor. The sensor 15 is configured to sense damage to the device or package, an intrusion to the device or package, or an attempt to intrude on the device or package. In some embodiments, the ROT module 10 uses secret keys to decrypt an identity package 45 that is found in the flash memory 60. The identity packet has information or contains the UID certification plus a signature that is used by the ROT module 10 to validate the device 100 or the ASIC (e.g., CPU 40) for compliance in operations with a policy. In some embodiments, the ROT module 10 performs a validation check during a startup or powering on of the ASIC or device 100. In other instances, the validation check is performed on a continuous or periodic basis during device operations to ensure that the device 100 remains in compliance.

At step 815, a sensor 15 monitoring the package detects that the package is being opened or intruded upon and sends data to the ROT module 10 about the event. In some embodiments, the sensor 15 is configured to sense damage to the device or package, an intrusion to the device or package, or an attempt to intrude on the device or package. In response to damage, attempted intrusion, or an intrusion of the device 100 sensed by the sensor 15, data is sent to the ROT Module 10. In some embodiments, the attack is a glitching fault or other electrical interruption that is detected by the sensor 15, and data of this fault or interruption is sent to the CPU 40. In instances, based on the data received, the CPU 40 may determine that the fault or interruption is being caused by an attack or an attempt to attack the CPU 40 or ASIC to discover the secret (e.g., secret keys) or capture data of identity package 45 that is in the flash 60 in a decrypted state. The ROT module 10 via the CPU 40 is configured using an algorithm to determine the likelihood that an attack is about to occur or has occurred to the device 100.

At step 820, the CPU 40 (or ROT firmware) may check whether a debug/RMA message 50 has been issued (through a secure channel) prior to initiating the tamper resistance process to ensure that device 10 is being attacked or subject to an unauthorized intrusion. If the debug/RMA package or message is present then the CPU 40 does not proceed with the tamper resistance process. If the debug/RMA package or message is not present, then the ROT module 10 or the PCU 40 initiates and executes a script to cause or prevent the identity package 45 from being decrypted or remaining in a decrypted state at the flash 60.

At step 825, the ROT module 10 determines or verifies that an attack is occurring based on finding via a secure channel that a debug/RMA package is not present. Since the debug package is not present, the ROT module 10 or the CPU 40 executes the tamper-resistant process. The ROT module 10 activates the tamper-resistant process to prevent access to identity package 45, and/or the secret contained with identity package 45. That is, the CPU 40 (or ROT firmware) may initiate a tamper resistance process as an active response to change the secret or destroy the secret.

At step 830, if the debug/RMA package is not present, the CPU 40 or ROT module 10 may send a signal to overwrite any number of 0 efuse bits of the secret key to 1. The result of the overwrite is that the secret is lost and therefore the ROT module 10 (or CPU) is not able to decrypt the identity package, and hence the ROT module 10 would cause the device 100 or other device coupled that relies on the identity package 45 for validation not to function. In some embodiments, the tamper resistance process may apply a script or algorithm to delete or erase bits of the secret key or insert bits into the secret to render the secret key invalid. In some instances, a signal may be applied to overwrite one, any number of, or all of the efuse bits of the secret key to render the secret key unusable and to prevent the contents of the identity package 45 and any other proprietary information from being exposed or accessed. If the ASIC is under attack, by blanking out the secret using the tamper resistance process, then where another ASIC was to use identity package data for unauthorized use, with another UID. The UID and the replicated ASIC would not be able to function because the identity package's content is not available. In some embodiments, the ROT module 10 can be configured to perform other manipulations of the secret key bit data other than overwriting certain bits such as reordering the bits, blanking the bits, or changing the bits. In other words, it is contemplated that a number of schemes can be implemented to prevent exposure of the bits.

Figure 9:
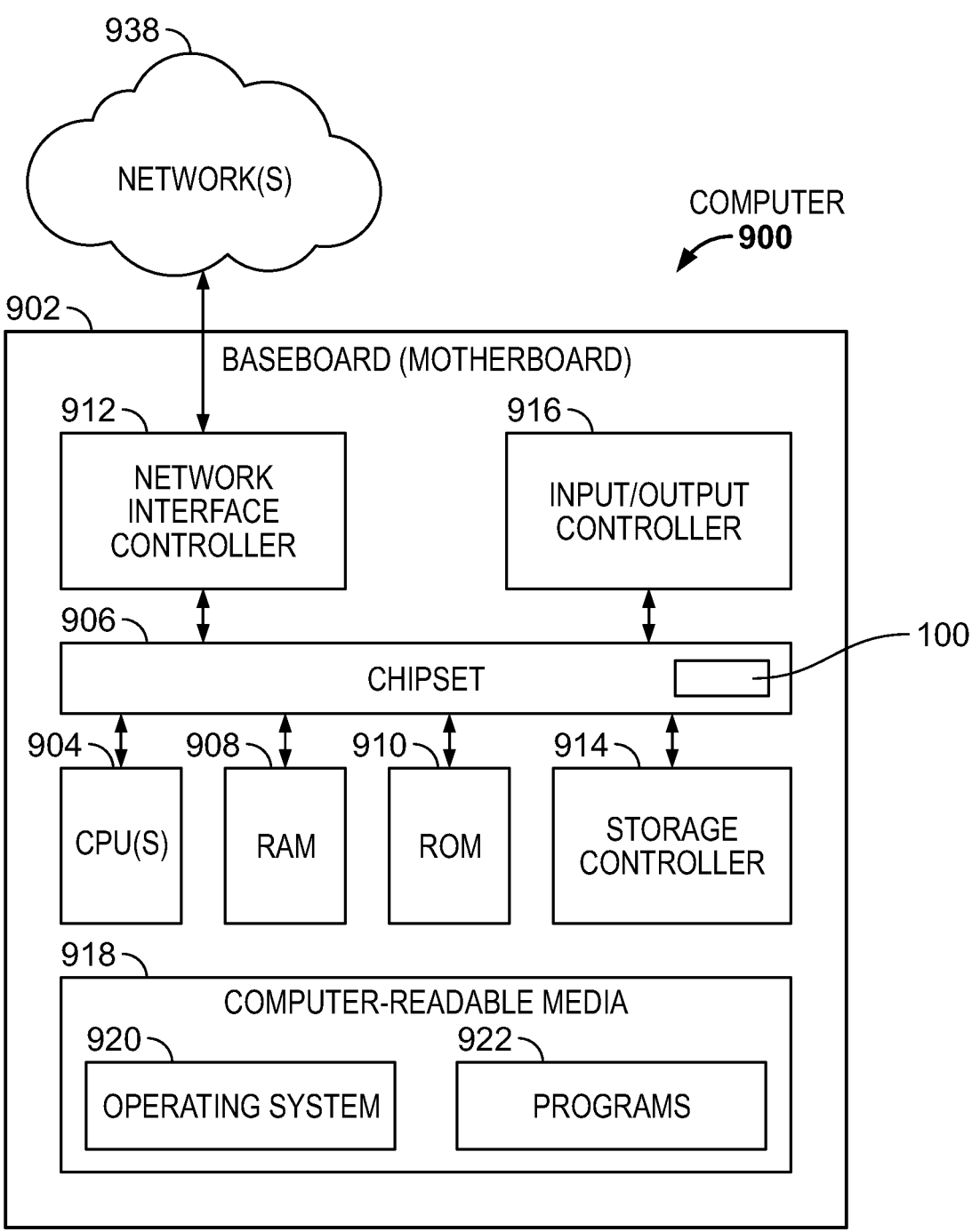
FIG. 9 illustrates a computer architecture diagram showing an example of computer hardware architecture for implementing a computer that has a chipset that integrates the zero-trust environment and is utilized to implement aspects of the various technologies presented herein.

FIG. 9 illustrates a computer architecture diagram showing an example of computer hardware architecture for implementing a computer that has a chipset that integrates the zero-trust environment and is utilized to implement aspects of the various technologies presented herein. The computer hardware architecture with a computer 900 connected to a network 938 is shown in FIG. 9 with a chipset 906 that incorporates or integrates the device 100 that includes the various elements of the isolated ROT CPU Complex with the fuse box, the mailbox, the access engine, the CIFG, the SPI Flash (e.g., flash 60 of FIG. 1) storing the encrypted firmware, and the other components described in FIGS. 1-8.

The chipset 906 provides an interface between the CPU(s) 904 and the remainder of the components and devices on the baseboard 902. The chipset 906 may provide an interface to a RAM 908, used as the main memory in the computer 900. The chipset 906 may further provide an interface to a computer-readable storage medium such as read-only memory (ROM) 910 or non-volatile RAM (NVRAM) for storing basic routines that help to startup the computer 900 (and is separate from the ROM and RAM of the isolated ROT CPU Complex) and to transfer information between the various components and devices. The ROM 910 or NVRAM may also store other software components necessary for the operation of the computer 900 in accordance with the configurations described herein.

The computer 900 includes a baseboard 902, or "motherboard," which is a printed circuit board to which a multitude of components or devices may be connected by way of a system bus or other electrical communication paths. In one illustrative configuration, one or more central processing units (CPUs) 904 operate in conjunction with a chipset 906 and the device 100 including the isolated ROT CPU Complex, the fuse box, the mailbox, and the firmware (e.g., components of the SOC). The CPU 904 may be a standard programmable processor that performs arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 900 may operate in a networked environment using logical connections to remote computing devices and computer systems through a network. The computer 900 may be connected to a storage device 918 that provides non-volatile storage for the computer. The storage device 918 (separate from the secure storage (e.g., Fuse box, Mailbox) may store an operating system 920, programs 922 (e.g., any algorithm, script, and computer-readable and/or computer-executable code described herein), and data, which have been described in greater detail herein. The storage device 918 may be connected to the computer 900 through a storage controller 914 connected to the chipset 906. The storage device 918 may consist of one or more physical storage units. The storage controller 914 may interface with the physical storage units through a serial attached SCSI (SAS) interface, a serial advanced technology attachment (SATA) interface, a fiber channel (FC) interface, or another type of interface for physically connecting and transferring data between computers and physical storage units.

The computer 900 may store data on the storage device 918 by transforming the physical state of the physical storage units to reflect the information being stored. The specific transformation of the physical state may depend on various factors, in different examples of this description. Examples of such factors may include but are not limited to, the technology used to implement the physical storage units, whether the storage device 918 is characterized as primary or secondary storage, and the like.

For example, computer 900 may store information the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the storage device 918 by detecting the physical states or characteristics of one or more particular locations within the physical storage units.

In addition to the storage device 918 described above, the computer 900 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 900

By way of example, and not limitation, computer-readable storage media may include volatile and non-volatile, removable, and non-removable media implemented in any method or technology. Computer-readable storage media includes but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 918 may store an operating system 920 utilized to control the operation of the computer 900. According to one example, the operating system 920 comprises the LINUX® operating system. According to another example, the operating system comprises the WINDOWS® SERVER operating system from MICROSOFT® Corporation of Redmond, Washington. According to further examples, the operating system may comprise the UNIX® operating system or one of its variants. It may be appreciated that other operating systems may also be utilized. The storage device 918 may store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the examples described herein. These computer-executable instructions transform the computer 900 by specifying how the CPUs 904 transitions between states, as described above. According to one example, the computer 900 has access to computer-readable storage media storing computer-executable instructions which, when executed by the computer 900, perform the various processes described above with regard to FIGS. 1 through 8. The computer 900 may also include computer-readable storage media having instructions stored thereupon for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, or other type of output device. It will be appreciated that the computer 900 might not include all of the components shown in FIG. 9, may include other components that are not explicitly shown in FIG. 9, or might utilize an architecture completely different than that shown in FIG. 9.

The computer 900 may include one or more hardware processor(s) such as the CPUs 904 configured to execute one or more stored instructions. The CPUs 904 may comprise one or more cores. Further, the computer 900 may include one or more network interface controllers 912 (with network interfaces) configured to provide communications between the computer 900 and other devices, such as the communications described herein. The network interface controllers 912 may be coupled with or include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. Program 922 may comprise any type of program or process to perform the techniques described in this disclosure. Program 922 may enable the devices described herein to perform various operations.

The examples described herein provide systems and methods that may utilize an isolated ROT code with built-on keys provided in a trust zone environment for decrypting an identity package, and for authentication and monitoring operations within the IC, ASIC, or SOC.

Clause 1. A method for monitoring an Integrated Circuit (IC), comprising: decrypting, by a Root-Of-Trust (ROT) module, an identity package that resides at a non-volatile memory of the IC using a secret accessed by the ROT module wherein the identity package is configured in a decrypted state at the non-volatile memory by use of the secret by the ROT module; discovering, by the ROT module, based on monitoring data from at least one sensor operably coupled to the ROT module that an attack is at least being attempted on a package of the IC; determining, by the ROT module, whether a debug package is present in response to the attack; and in response to a determination that the debug package is not present, executing by the ROT module, a tamper resistance process to prevent using of the secret by the ROT module and the identity package from being placed or remaining in a decrypted state in the non-volatile memory of the IC.

Clause 2. The method of clause 1, wherein the secret comprises a secret key used to decrypt the identity package.

Clause 3. The method of clause 2, further comprising determining by the ROT module, whether an attack is being attempted on the IC during at least one of a powering on of the IC or ongoing operations of the IC.

Clause 4. The method of clause 3, further comprising: determining by the ROT module, from data from the at least one sensor that is configured to monitor at least one of damage or an intrusion to a package in which the IC is disposed, whether an attack on the IC is being attempted during at least powering on of the IC.

Clause 5. The method of clause 4, wherein the tamper resistance process further comprising: executing a script by the ROT module to at least overwrite one or more bits of the secret key to prevent the ROT module from decrypting the identity package in the non-volatile memory.

Clause 6. The method of clause 5, wherein the tamper resistance process comprises an active process that is initiated upon discovery of at least one of the damage or an intrusion to the package.

Clause 7. The method of clause 6, wherein the attack comprises a glitching type attack during at least a powering on of the IC.

Clause 8. The method of clause 7, wherein the tamper resistance process further comprising: executing a script by the ROT module to at least overwrite one or more bits of the secret key causing the identity package to be in a non-decrypted state in the non-volatile memory.

Clause 9. The method of clause 7, wherein the tamper resistance process further comprising: executing a script by the ROT module to at least erase one or more bits of the secret key to prevent the ROT module from being able to decrypt the identity package at the non-volatile memory.

Clause 10. The method of clause 1, wherein the monitor of the IC comprises a continuous monitor of the package of the IC by the sensor.

Clause 11. The method of clause 1, wherein the IC comprises at least one of a System-On-a-Chip (SOC) or an Application-Specific Integrated Circuit (ASIC).

Clause 12. The method of clause 9, wherein the secret key comprises at least one built-in key accessible by the ROT module comprising an electrically programmable fuse (eFuse) configured during manufacturing of the IC.

Clause 13. A non-transitory computer-readable medium comprising an isolated Root of Trust (ROT) code storing instructions that, when executed by a processor, cause the processor to: determine whether an attack is being attempted on an Integrated Circuit (IC) during at least a powering on of the IC; decrypt an identity package that resides at a non-volatile memory of the IC using a secret accessed by the processor wherein the identity package is configured in a decrypted state by use of the secret at the non-volatile memory; discover, based on monitoring data from at least one sensor operably coupled to the processor, that an attack is being attempted on a package of the IC; determine whether a debug package is present; and in response to a determination that the debug package is not present, execute a tamper resistance process to prevent using of the secret and the identity package from being in the decrypted state in the non-volatile memory of the IC.

Clause 14. The non-transitory computer-readable medium of clause 13, wherein the processor is configured to determine whether an attack is being attempted on the IC during at least one of a powering on of the IC or ongoing operations of the IC.

Clause 15. The non-transitory computer-readable medium of clause 14, wherein the processor is configured to determine from data from the at least one sensor that is configured to monitor at least one of damage or an intrusion to a package in which the IC is disposed, whether an attack on the IC is being attempted during at least powering on of the IC.

Clause 16. The non-transitory computer-readable medium of clause 15, wherein the secret comprises a secret key, the processor is configured to execute a script to at least overwrite one or more bits of the secret key to prevent the processor from decrypting the identity package in the non-volatile memory.

Clause 17. The non-transitory computer-readable medium of clause 16, wherein the tamper resistance process comprises an active process that is initiated upon discovery of at least one of the damage or an intrusion to the package, and wherein the attack comprises a glitching type attack during at least a powering on of the IC.

Clause 18. The non-transitory computer-readable medium of clause 17, wherein the processor is configured to modify one or more bits of the secret key to render the secret unusable causing the identity package to be in a non-decrypted state in the non-volatile memory.

Clause 19. The non-transitory computer-readable medium of clause 18, wherein the IC comprises at least one of a System-On-a-Chip (SOC) or an Application-Specific Integrated Circuit (ASIC).

Clause 20. A computing device comprising: a processor; and a non-transitory computer-readable media storing instructions comprising Root-Of-Trust (ROT) code that, when executed by the processor, causes the processor to perform features comprising: decrypting an identity package that resides at a non-volatile memory of an Integrated Circuit (IC) using a secret accessible by the processor wherein the identity package is configured in a decrypted state at the non-volatile memory by use of the secret by the processor; discovering, based on monitoring data from at least one sensor operably coupled to the processor, that an attack is at least being attempted on a package of the IC; determining using a secure channel whether a debug package is present in response to the attack; and in response to a determination that the debug package is not present, executing, a tamper resistance process to prevent using of the secret and the identity package from being placed or remaining in a decrypted state in the non-volatile memory of the IC.

While the present systems and methods are described with respect to the specific examples, it is to be understood that the scope of the present systems and methods is not limited to these specific examples. Since other modifications and changes varied to fit particular operating requirements and environments will be apparent to those skilled in the art, the present systems and methods are not considered limited to the example chosen for purposes of disclosure and cover all changes and modifications that do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method for monitoring an Integrated Circuit (IC), comprising:
    decrypting, by a Root-Of-Trust (ROT) module, an identity package that resides at a non-volatile memory of the IC using a secret accessed by the ROT module, wherein the identity package includes identification data usable by the ROT module to determine that the IC is compliant for operating;
    discovering, by the ROT module, based on monitoring data from at least one sensor operably coupled to the ROT module that an attack is at least being attempted on a package of the IC;
    determining, by the ROT module, whether a debug package is present in response to the attack; and
    in response to a determination that the debug package is not present, executing by the ROT module, a tamper resistance process as an active response to the attack to prevent using of the secret by the ROT module and the identity package from being placed or remaining in a decrypted state in the non-volatile memory of the IC, wherein the tamper resistance process includes:
        causing the identity package to transition from the decrypted state to an encrypted state by encrypting the identity package; and
        at least one of overwriting, changing, or reordering one or more bits of the secret to generate a modified secret that is unable to decrypt the identity package resulting in an inability to verify that the IC is compliant for operating.

2. The method of claim 1, wherein the secret comprises a secret key used to decrypt the identity package.

3. The method of claim 2, further comprising determining by the ROT module, whether an attack is being attempted on the IC during at least one of a powering on of the IC or ongoing operations of the IC.

4. The method of claim 2, wherein the secret key comprises at least one built-in key accessible by the ROT module comprising an electrically programmable fuse (eFuse) configured during manufacturing of the IC.

5. The method of claim 3, further comprising:

determining by the ROT module, from data from the at least one sensor that is configured to monitor at least one of damage or an intrusion to a package in which the IC is disposed, whether an attack on the IC is being attempted during at least powering on of the IC.

6. The method of claim 5, wherein the tamper resistance process further comprising:

executing a script by the ROT module to at least one of overwrite, change, or reorder the one or more bits of the secret key to prevent the ROT module from decrypting the identity package in the non-volatile memory.

7. The method of claim 6, wherein the tamper resistance process comprises an active process that is initiated upon discovery of at least one of the damage or an intrusion to the package.

8. The method of claim 7, wherein the attack comprises a glitching type attack during at least a powering on of the IC.

9. The method of claim 8, wherein the tamper resistance process further comprising:

executing a script by the ROT module to at least one of overwrite, change, or reorder the one or more bits of the secret key causing the identity package to be in a non-decrypted state in the non-volatile memory.

10. The method of claim 8, wherein the tamper resistance process further comprising:

executing a script by the ROT module to at least erase one or more bits of the secret key to prevent the ROT module from being able to decrypt the identity package at the non-volatile memory.

11. The method of claim 1, wherein the monitoring data of the IC comprises a continuous monitoring of the package of the IC by at least one sensor.

12. The method of claim 1, wherein the IC comprises at least one of a System-On-a-Chip (SOC) or an Application-Specific Integrated Circuit (ASIC).

13. The method of claim 1, wherein the tamper resistance process includes overwriting one or more bits of the secret from a first binary value to a second binary value, wherein the secret comprises an electrically programmable fuse (eFuse).

14. The method of claim 1, wherein the identity package includes a certificate comprising a unique identifier (UID) of the IC and a signature containing properties unique to the IC.

15. The method of claim 1, wherein the tamper resistance process operates independently such that the secret is rendered inaccessible even if the ROT module exits out of its processing steps during the attack.

16. A non-transitory computer-readable medium comprising an isolated Root of Trust (ROT) code storing instructions that, when executed by a processor, cause the processor to:

determine whether an attack is being attempted on an Integrated Circuit (IC) during at least a powering on of the IC;

decrypt an identity package that resides at a non-volatile memory of the IC using a secret accessed by the processor, wherein the identity package is configured in a decrypted state by use of the secret at the non-volatile memory;

discover, based on monitoring data from at least one sensor operably coupled to the processor, that the attack is being attempted on a package of the IC;

determine whether a debug package is present; and in response to a determination that the debug package is not present, execute a tamper resistance process as an active response to the attack to prevent using of the secret and the identity package from being in the decrypted state in the non-volatile memory of the IC, wherein the tamper resistance process includes:

causing the identity package to transition from the decrypted state to an encrypted state by encrypting the identity package; and at least one of overwriting, changing, or reordering one or more bits of the secret to generate a modified secret that is unable to decrypt the identity package resulting in an inability to verify that the IC is compliant for operating.

17. The non-transitory computer-readable medium of claim 16, wherein the processor is configured to determine whether an attack is being attempted on the IC during at least one of a powering on of the IC or ongoing operations of the IC.

18. The non-transitory computer-readable medium of claim 17, wherein the processor is configured to determine from data from the at least one sensor that is configured to monitor at least one of damage or an intrusion to a package in which the IC is disposed, whether an attack on the IC is being attempted during at least powering on of the IC.

19. The non-transitory computer-readable medium of claim 18, wherein the secret comprises a secret key, the processor is configured to execute a script to at least one of overwrite, change, or reorder the one or more bits of the secret key to prevent the processor from decrypting the identity package in the non-volatile memory.

20. The non-transitory computer-readable medium of claim 19, wherein the tamper resistance process comprises an active process that is initiated upon discovery of at least one of the damage or an intrusion to the package, and wherein the attack comprises a glitching type attack during at least a powering on of the IC.

21. The non-transitory computer-readable medium of claim 20, wherein the processor is configured to modify one or more bits of the secret key to render the secret unusable causing the identity package to be in a non-decrypted state in the non-volatile memory.

22. The non-transitory computer-readable medium of claim 21, wherein the IC comprises at least one of a System-On-a-Chip (SOC) or an Application-Specific Integrated Circuit (ASIC).

23. A computing device comprising:

a processor; and a non-transitory computer-readable media storing instructions comprising Root-Of-Trust (ROT) code that, when executed by the processor, causes the processor to perform features comprising:

decrypting an identity package that resides at a non-volatile memory of an Integrated Circuit (IC) using a secret accessible by the processor, wherein the identity package includes identification data usable by the ROT code to determine that the IC is compliant for operating;

discovering, based on monitoring data from at least one sensor operably coupled to the processor, that an attack is at least being attempted on a package of the IC;

determining using a secure channel whether a debug package is present in response to the attack; and in response to a determination that the debug package is not present, executing a tamper resistance process as an active response to the attack to prevent using of the secret and the identity package from being placed or remaining in a decrypted state in the non-volatile memory of the IC, wherein the tamper resistance process includes:

causing the identity package to transition from the decrypted state to an encrypted state by encrypting the identity package; and at least one of overwriting, changing, or reordering one or more bits of the secret to generate a modified secret that is unable to decrypt the identity package resulting in an inability to verify that the IC is compliant for operating.

* * * * *